O. W. WILLCOX.
TREATMENT OF WASTE SULFITE LIQUORS.
APPLICATION FILED SEPT. 8, 1915. RENEWED DEC. 14, 1918.

1,312,293.

Patented Aug. 5, 1919.

INVENTOR,
Oswin W. Willcox
BY
Pennie Davis Marvin
ATTORNEYS

O. W. WILLCOX.
TREATMENT OF WASTE SULFITE LIQUORS.
APPLICATION FILED SEPT. 8, 1915. RENEWED DEC. 14, 1918.

1,312,293.

Patented Aug. 5, 1919.
2 SHEETS—SHEET 2.

INVENTOR
Oswin W. Willcox
BY Pennie Davis Marvin
ATTORNEYS

UNITED STATES PATENT OFFICE.

OSWIN W. WILLCOX, OF DOVER, NEW JERSEY.

TREATMENT OF WASTE SULFITE LIQUORS.

1,312,293.      Specification of Letters Patent.      Patented Aug. 5, 1919.

Application filed September 8, 1915, Serial No. 49,628. Renewed December 14, 1918. Serial No. 266,842.

*To all whom it may concern:*

Be it known that I, OSWIN W. WILLCOX, a citizen of the United States, residing at Dover, Morris county, and State of New Jersey, have invented certain new and useful Improvements in the Treatment of Waste Sulfite Liquors; and I do hereby declare the following to be a full, clear, and exact description of the invention, such as will enable others skilled in the art to which is appertains to make and use the same.

It is well known that the waste sulfite liquor from sulfite paper mills contains fermentable sugar which can be changed by yeast into alcohol. Thus, ordinary waste sulfite liquor containing about 2% of fermentable sugar, will give upon fermentation about 1% by weight of alcohol.

Nevertheless, the recovery of alcohol from a liquid where the percentage of alcohol is only about 1% by weight is a relatively difficult and expensive process, because in order to drive off the alcohol by heat, it is necessary to raise the temperature of the whole mass of liquor to practically the boiling point of water. The amount and cost of the steam necessary to supply this amount of heat, therefore, is very large in proportion to the value of the alcohol produced. For this reason it becomes of importance to reduce the cost of the distillation of the fermented waste sulfite liquor, in order to render it possible to recover alcohol from waste sulfite liquors which contain too little fermentable sugars to admit of distillation by the usual method of handling such liquors.

In effecting such a desired economy according to the present invention, I make use of the waste heat contained in the raw hot waste sulfite liquor as it comes from the digesters at the end of the cook; that is, when the contents of the digester are brought into the blow-pit, where the liquor is separated from the crude paper pulp.

The hot raw waste liquor as it runs from the blow-pit has practically the temperature of boiling water, namely 100° C. Before this raw waste liquor can be fermented, it must be cooled down to the fermenting temperature, which is about 30° C., so that an amount of heat represented by a fall of temperature through 70° C. is lost under present methods. It is this heat which I propose to save and utilize. The amount of this heat is considerable when expressed in tons of coal per year, as may be seen from the following example:

An ordinary digester will yield about 525 cu. ft. of liquor at each cook, which is equal to about 32,949 lbs. of water. About 1 lb. of coal is required to heat 40 lbs. of water from 0° C. to 100° C., or 1 lb. of coal will raise the temperature of about 52 lbs. of water from 30° to 100° C., or through a temperature interval of 70° C. Conversely, 52 lbs. of water cooling from 100° C. to 30° C. will give off heat equivalent to about 1 lb. of coal, from which it follows that 525 cu. ft. of waste liquor in dropping from 100° to 30°, will give off heat equal to about 633 lbs. of coal. As a digester, under ordinary management, makes two cooks per day, and as a sulfite paper mill of average size has on the average five such digesters, the total amount of heat in the daily output of the waste sulfite liquor from such a mill is represented by $10 \times 633 = 6,330$ lbs. of coal, equal to about $3\frac{1}{6}$ tons. In a year of 300 working days, this would amount to about 950 tons, which represents a considerable item in the yearly operation of a waste sulfite liquor distillery.

A very large part of this heat, which at present is lost, is, according to the present invention, saved, and made use of in distilling the fermented waste sulfite liquors by using the raw hot liquor to pre-heat the fermented sulfite liquor before the latter is sent to the distilling apparatus. The transfer of the heat from the hot, raw liquor to the fermented liquor ready for distillation may be effected on the counter-current principle, in a heater consisting of an inner pipe inclosed in an outer pipe, the outer pipe being for the circulation of the liquid to be heated, and the inner pipe for the circulation of the heating liquid.

As, however, the volume of the fermented sulfite liquor is practically equal to the volume of the hot raw liquor, it will not be practicable to preheat the fermented liquor to the neighborhood of 100° C. except by the use of a very large preheater, the expense of installation and maintenance of which would be considerable. Therefore, I make use of a further source of waste heat in a waste sulfite liquor distillery, namely, the hot spent liquor which issues from the bottom of the distilling apparatus in which it has been deprived of its alcohol by distillation with direct steam.

In the recovery of alcohol from an alcoholic liquid it is not only necessary to warm up the liquid to its boiling point, but a certain excess amount of steam must be supplied to effect the actual removal of the alcohol. From this necessary use of live steam in the distilling apparatus, it results that the spent liquor issues from the bottom of the apparatus at a temperature substantially equal to the boiling point of water. The heat available in this hot spent liquor is also made use of, according to the present invention, for further preheating the waste sulfite liquor after fermentation and before distillation.

Since the volume of the spent liquor after distillation, as well as that of the hot raw liquor before fermentation, is substantially the same as that of the fermented liquor to be distilled, it will be seen that there are two volumes of hot liquor available for preheating one volume of the fermented liquor. By thus preheating the fermented liquor before distillation by means of both the hot raw liquor and the hot waste liquor, the fermented liquor is rapidly warmed up nearly to the boiling temperature before it enters the still. The waste heat of both the hot raw liquor and of the hot spent liquor is thus utilized in preheating the fermented liquor to be distilled, so that the heat necessary to be supplied in the still is thereby correspondingly diminished.

Various types of counter-current apparatus are available for purposes of the present invention. The fermented liquor may thus be subjected simultaneously to the heating effect of both the hot raw liquor and the hot waste liquor, in an appropriate interchanger having three concentric compartments. Alternatively, and preferably, the apparatus is so arranged that the fermented liquor is first preheated by the hot raw liquor, and the raw liquor thus cooled to a corresponding extent; and subsequently the thus partly preheated fermented liquor is further preheated by the hot spent liquor from the still.

The invention will be further described in connection with the apparatus illustrated, more or less diagrammatically in the accompanying drawings, but it will be understood that the invention is illustrated by, but is not limited to, the specific embodiments thereof thus illustrated and described.

In the accompanying drawings, Figure 1 shows in diagram, a flow sheet or arrangement of apparatus embodying the invention;

Figure 1:
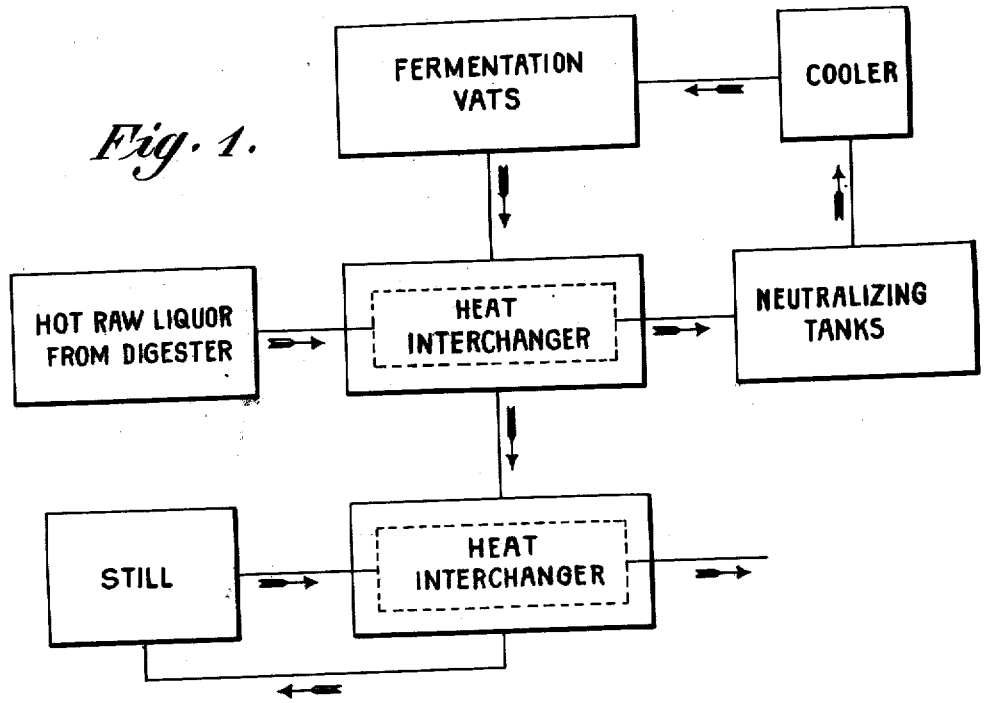

By reference to Fig. 1, it will be seen that the fermented liquor from the fermentation vats passes first to the heat interchanger where it is brought into heat interchanging relation with the hot raw liquor from the digester, and then to the heat interchanger where it is brought into heat interchanging relation with the hot spent liquor from the still. The hot spent liquor from the still is thus cooled and its heat, which would otherwise be lost, is made use of in further preheating the fermented liquor, the temperature of this preheated liquor being raised nearly to the boiling point. The hot raw liquor is cooled so that it is nearer the proper temperature for fermentation. After being thus cooled, it is passed to the neutralizing tanks where it is neutralized to an appropriate degree. It is then further cooled, if necessary, to the proper temperature for fermentation by passage through a further cooler.

This arrangement of Fig. 1 is advantageous for the reason that the maximum heating effect of the hot raw liquor upon the fermented liquor is obtained at the same time as the maximum cooling effect of the fermented liquor upon the hot raw liquor. By an appropriate counter-current heat interchanger, the temperature of the escaping liquids will be substantially the same, so that, for example, the fermented liquor can be preheated from about 30° C. to about 70° C., and the hot raw liquor cooled from about 100° C. to about 70° C. The additional cooler for the raw liquor before it reaches the fermentation vats enables the temperature of this liquor to be further reduced to the proper temperature for fermentation.

In the second heat interchanger, the partly preheated fermented liquor, at a temperature of e. g. 70° C. is further preheated by the hot spent liquor to a temperature which may approximate e. g. 85° C., while the spent liquor is cooled to a corresponding degree.

Figure 2:
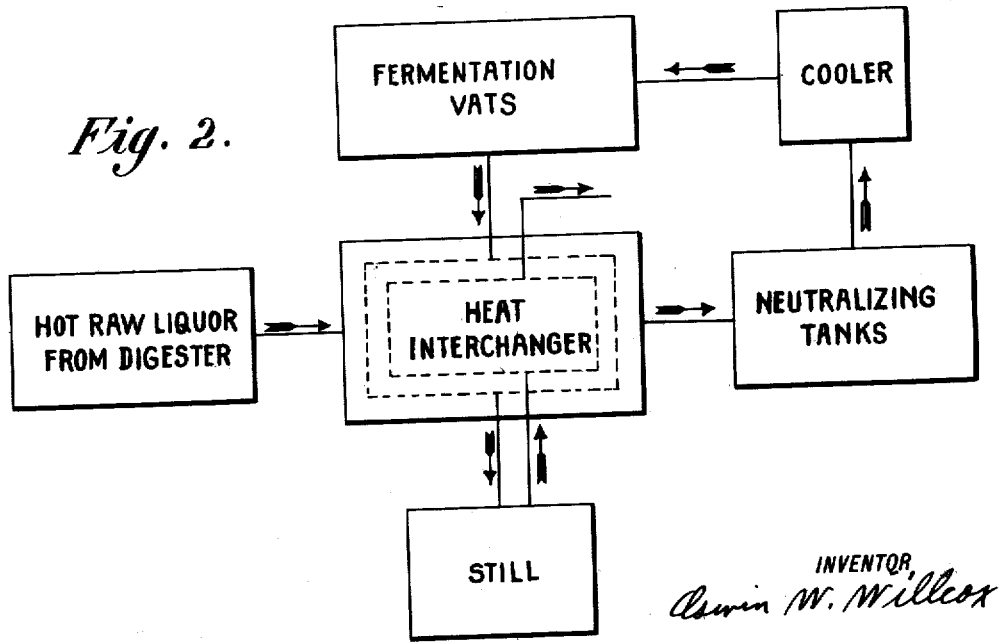
Fig. 2 shows a modified arrangement of apparatus.

In the arrangement of Fig. 2, the fermented liquor is passed through the central coil or compartment of a heat interchanger where it is subjected on one side to the hot raw liquor and on the other side to the hot spent liquor. These liquors accordingly act simultaneously to heat the fermented liquor, and both leave the heat interchanger at about the same temperature.

Figure 3:
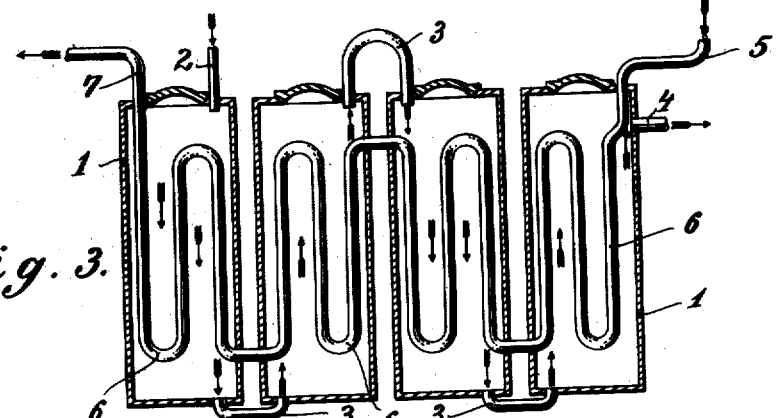
Fig. 3 shows, partly in section and partly in elevation, a preheating apparatus of the type illustrated in Fig. 1.
Figure 4:
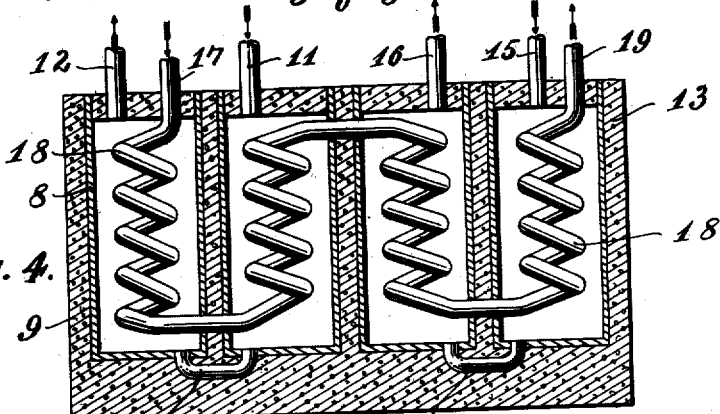
Fig. 4 shows a modified form of preheater such as indicated in Fig. 1.

Preheaters such as those of Fig. 1 are illustrated in Figs. 3 and 4. In the construction of Fig. 3, a series of vertical tanks or towers are provided with an inlet 2 for the fermented liquor, connections 3 for circulating the liquor therethrough in series, and outlet 4 for the preheated liquor. The hot raw liquor, or the hot spent liquor, as the case may be, enters at 5 and passes through the coil 6, escaping at 7. The containers 1 may be provided with an outer insulating covering or may themselves be constructed of insulating material. Suitable manholes may also be provided at the top of the containers for permitting access thereto.

In this type of preheater, two of which are indicated in Fig. 1, the fermented liquor passes through the containers in series while the hot raw or spent liquor circulates through the coils in the opposite direction. It will be understood that the number of turns or coils 6 within the separate containers or compartments can be increased or decreased as desired in order to secure the maximum heating effect upon the fermented liquor. It will also be understood that the number of these containers or compartments can be increased or decreased, and that one or more of the compartments may be cut out (by means not shown) for cleaning purposes.

In the construction of Fig. 4, both heat interchangers of Fig. 1 are combined in a single structure. The chambers or compartments 8 are suitably inclosed in insulating material 9 and communicate with each other through the connection 10. The inlet and outlet for the hot raw liquor from the digester are indicated respectively at 11 and 12. The chambers 13 for the hot spent liquor from the still are similar to the chambers 8 and are connected together at 14 in a similar manner. The inlet and outlet for the hot waste liquor are indicated respectively at 15 and 16.

The fermented liquor enters at 17 and passes through the coils 18, arranged in each of the compartments 8 and 13, and makes its escape at 19. This construction and arrangement is similar to that of Fig. 3 except that both heat interchangers are combined in a single structure. A similar counter-current interchange is obtained so that the hot liquors are progressively cooled and the cooler fermented liquor progressively heated. The fermented liquor is first heated by the hot raw liquor, and subsequently by the hot spent liquor.

Figure 5:
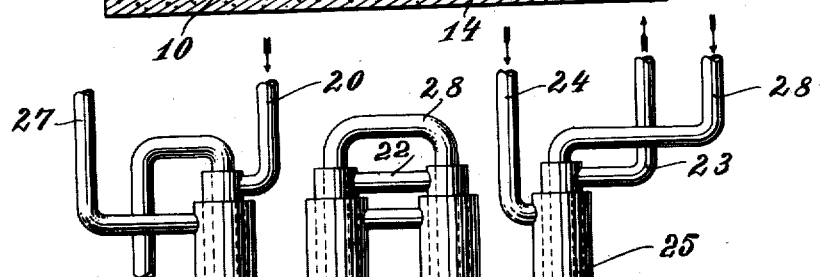
Fig. 5 shows a preheater of the type indicated in Fig. 2.

The preheater of Fig. 5 is of the type indicated in Fig. 2 and comprises three concentric tubes or chambers 28, 21 and 25 respectively. The liquor from the fermentation vats enters at 20 into the central compartments 21 which communicate with each other at 22 and the last of which is provided with a suitable outlet 23 leading to the still. The hot raw liquor from the digester enters at 24 into the outer compartments 25 which communicate with each other at 26 and the last of which is provided with an outlet at 27. The hot spent liquor from the still enters at 28. With this arrangement, a similar counter-current heating effect is obtained to that obtained with the constructions of Figs. 3 and 4, but the heating of the distilled liquor by the hot raw and spent liquors takes place at the same time instead of successively. In practice, it is advantageous to make the innermost and outermost pipes of somewhat greater capacity than the middle concentric pipe.

It will be understood that the heat interchangers can be constructed of metal or other suitable material capable of withstanding the temperatures and action of the liquors passing through them. It will also be understood that the size and proportions, as well as the number of individual elements of these heat interchangers can be varied in accordance with the amount of the liquor to be treated.

I am aware that it has been heretofore proposed to use hot spent liquor from a still for preheating a fermented liquor previous to distillation. According to the present invention, however, there is utilized both the waste heat of the spent liquor and the waste heat of the hot raw liquor from the digester. Thereby not only is the spent liquor cooled and waste heat thereby recovered from it, but the hot raw liquor is itself cooled before fermentation. This heat interchange is accordingly mutually advantageous in its heating effect upon the fermented liquor and in its cooling effect upon the raw liquor before fermentation.

Because of the preheating of the fermented liquor, in the manner above described, by the waste heat of the hot raw and spent liquors, it is raised to a high temperature so that the distilling operation is restricted to the relatively slight further heating necessary to expel the alcohol from the preheated liquor.

What I claim is:

1. In the fermentation of waste sulfite liquors and the recovery by distillation of the resulting alcohol, the method of promoting the economic efficiency of the operation, which comprises supplying the fermented liquor to the still, and, during the transit of the fermented liquor to the still circulating said fermented liquor into heat-interchanging relation to the hot raw liquor from the digester and the hot spent liquor from the still, thereby preheating the fermented liquor so that it will enter the still at a temperature approximating the temperature of distillation, and supplying to the fermenting vats the cooled hot raw liquor; substantially as described.

2. An apparatus for the fermentation of waste sulfite liquor and the recovery, by distillation, of alcohol from the fermented liquor, comprising means for circulating the fermented liquor into heat interchanging relation to both the hot raw liquor from the digester, and the spent liquor from the still, whereby the spent liquor and the hot raw liquor are cooled and the fermented liquor thereby preheated before distillation; substantially as described.

3. An apparatus for the fermentation of waste sulfite liquor and the recovery, by distillation, of alcohol from the fermented liquor, comprising means for first circulating the fermented liquor into heat interchanging relation to the hot raw liquor from the digester, whereby the hot raw liquor is cooled and the fermented liquor preheated, and means for subsequently circulating the fermented liquor into heat interchanging relation to the spent liquor from the still, whereby the spent liquor is cooled and the fermented liquor is further preheated before distillation; substantially as described.

In testimony whereof I affix my signature.

OSWIN W. WILLCOX.